March 26, 1968   J. A. BURNS   3,375,495
SEATBELT ALARM SYSTEM
Filed Feb. 12, 1965
3 Sheets-Sheet 1
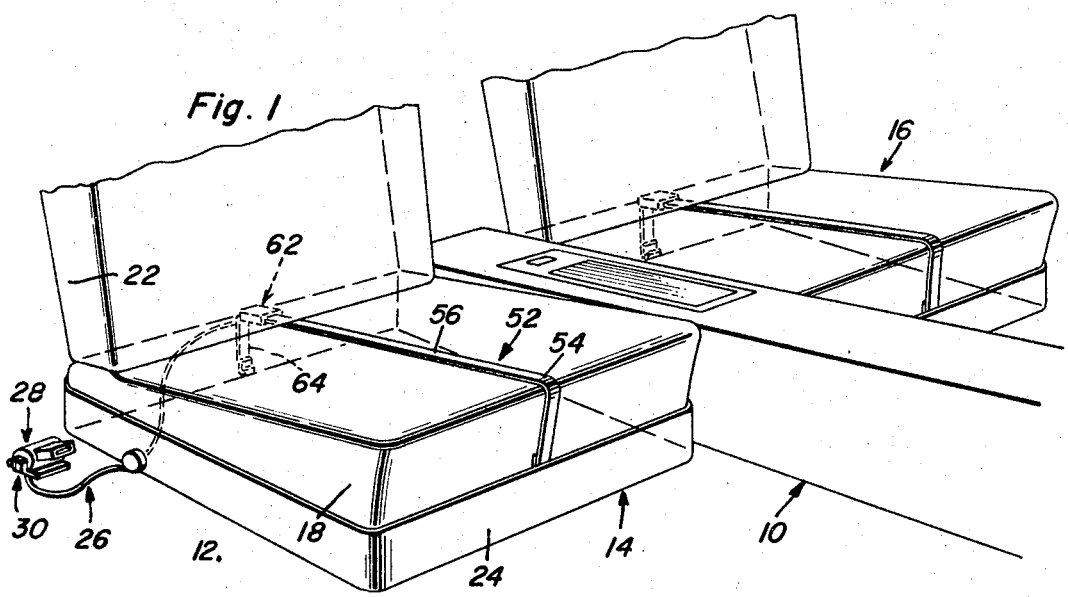
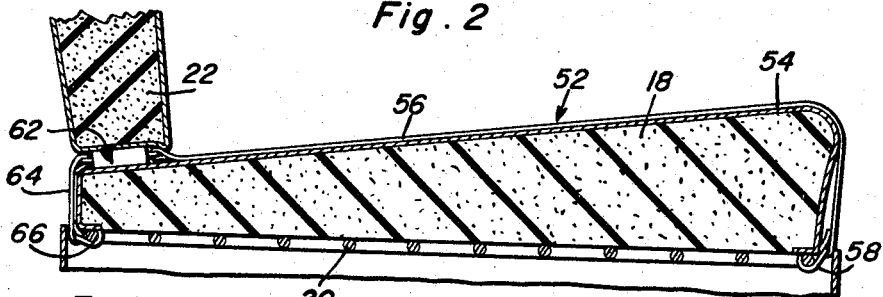
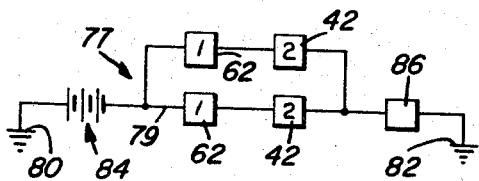
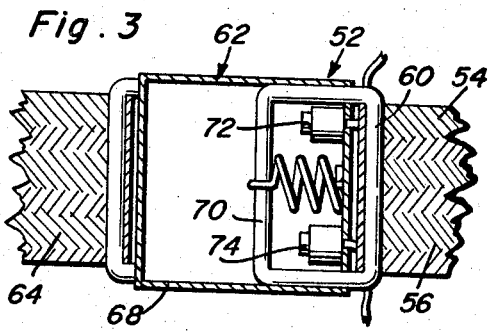
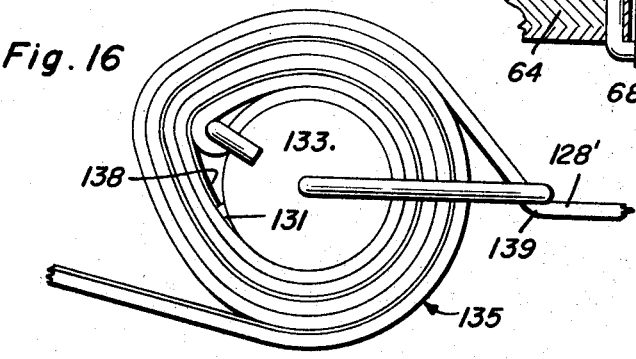
Joel A. Burns
INVENTOR.
BY *Clarence A. O'Brien*
and *Harvey B. Jacobson*
Attorneys March 26, 1968   J. A. BURNS   3,375,495
SEATBELT ALARM SYSTEM
Filed Feb. 12, 1965   3 Sheets-Sheet 2
Fig. 5
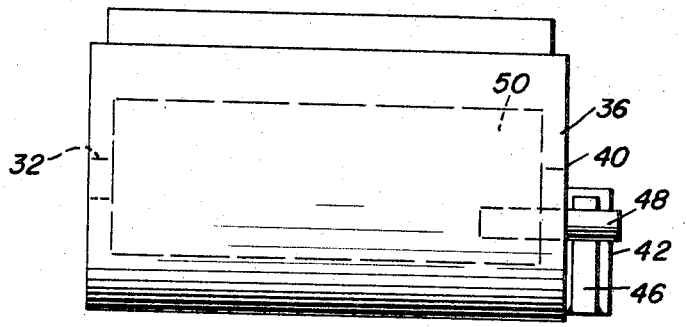
Fig. 6
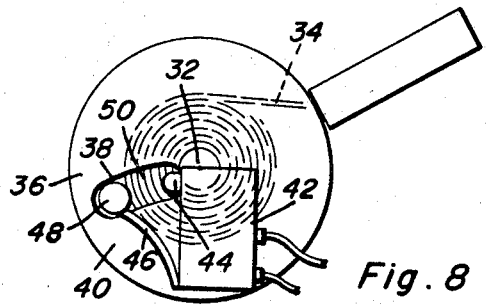
Fig. 7
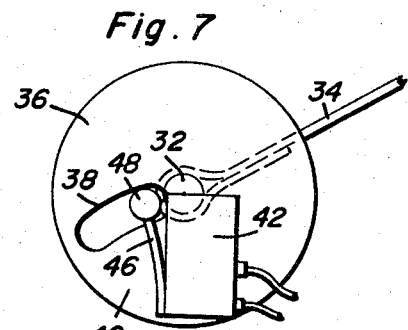
Fig. 8
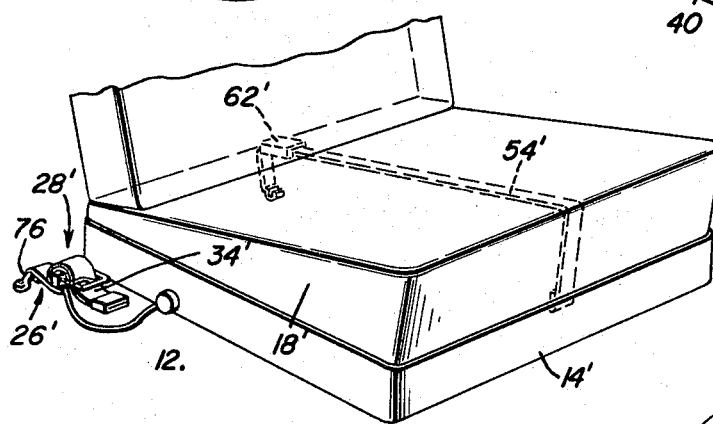
Fig. 10
Fig. 9
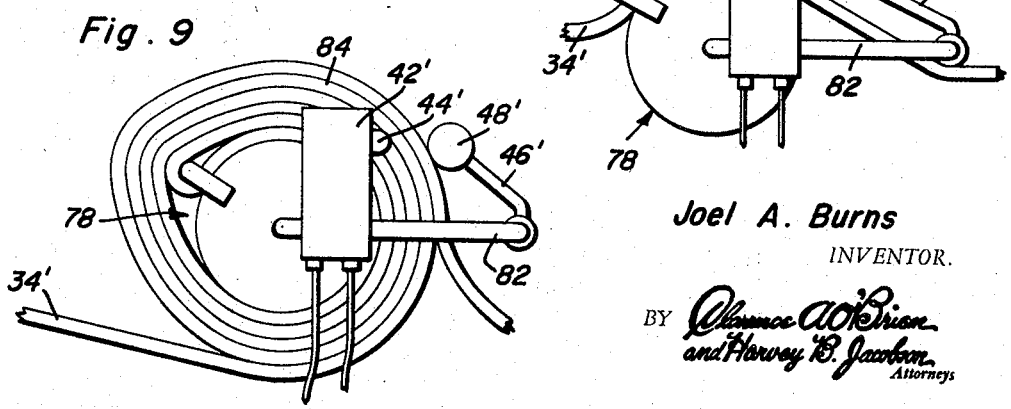
Joel A. Burns
INVENTOR.
BY *Clarence A. O'Brien*
and *Harvey B. Jacobson*
Attorneys March 26, 1968   J. A. BURNS   3,375,495
SEATBELT ALARM SYSTEM
Filed Feb. 12, 1965   3 Sheets-Sheet 3
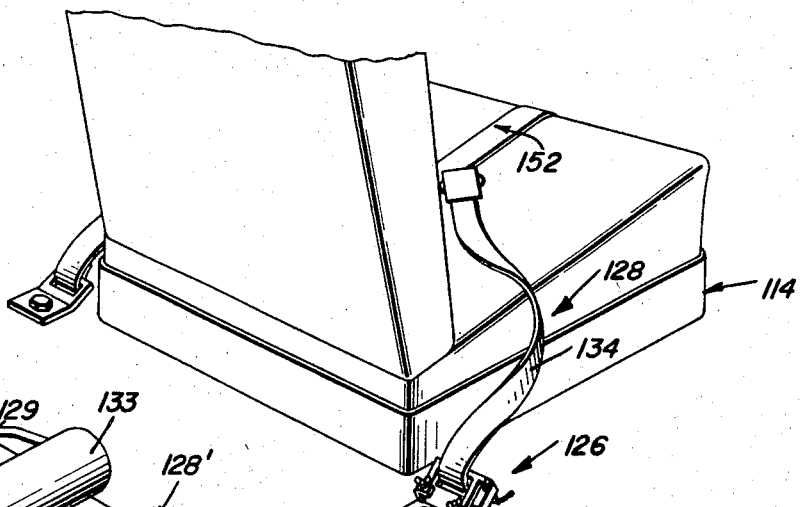
Fig. 11
Fig. 15
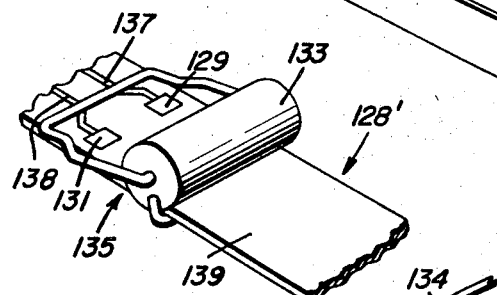
Fig. 12
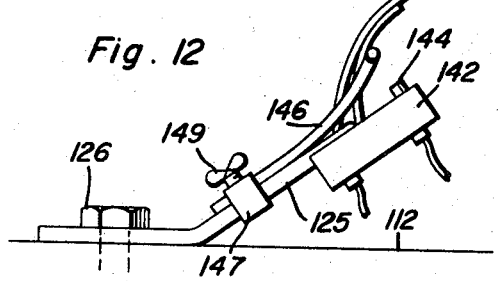
Fig. 13
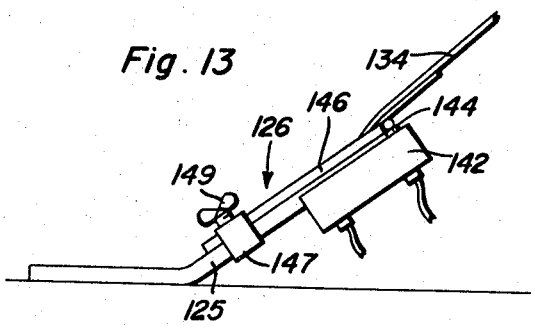
Fig. 14
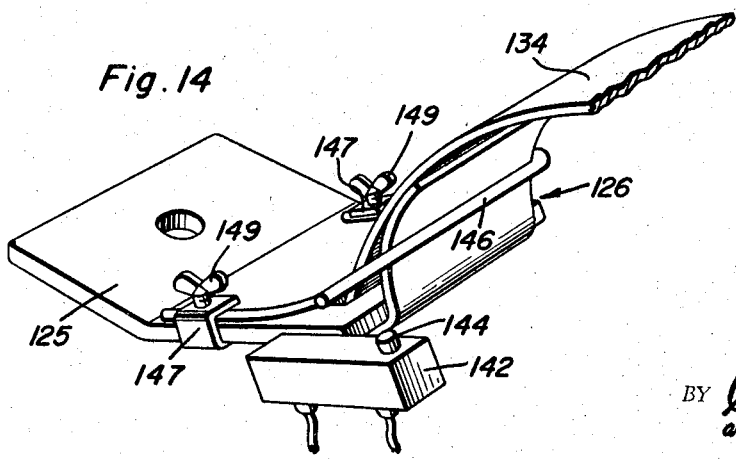
Joel A. Burns
INVENTOR.
BY *Clarence A. O'Brien*
*and Harvey B. Jackson*
Attorneys

United States Patent Office 3,375,495
Patented Mar. 26, 1968

3,375,495
SEATBELT ALARM SYSTEM
Joel A. Burns, 4201 Broadmoor NE.,
Albuquerque, N. Mex. 87108
Filed Feb. 12, 1965, Ser. No. 432,126
6 Claims. (Cl. 340—52)

ABSTRACT OF THE DISCLOSURE

A seatbelt alarm system for a motor vehicle operable to render an alarm in response to positioning of the seat belt assemblies of the vehicle in other than the prescribed operative positions but only when the associated seat is occupied by a person.

---

This invention relates to a novel and useful seatbelt alarm system and more specifically to a system designed primarily for the purpose of alerting the driver of a vehicle as well as a passenger in the vehicle in the event the driver or the passenger does not have his seat belt properly fastened.

Various types of seatbelt alarm systems have heretofore been designed and most of these systems include either signal means actuatable by an unsafe condition for means for rendering either the starter solenoid circuit, ignition system or other circuits either operative or inoperative. These previous seatbelt alarm systems have for the most part included a pair of seatbelt sections with circuit defining conductor means extending longitudinally thereof and electrically connectible with each other upon securement of the free ends of the seatbelt sections together. These conductor means could be serially disposed in a starter solenoid circuit in order that the starter solenoid could not be actuated until such time as the seatbelt ends were secured together or these circuit defining means carried by the belt sections could be otherwise electrically and operatively connected to some form of signal means for rendering a signal when the associated seatbelt sections were not secured together in the proper manner.

The seat belt alarm system of the instant invention goes one step further in that it is operable to actuate the associated alarm system in response to positioning of the seatbelt sections in other than the prescribed operative positions but only when the associated seat is occupied by a person.

In a seatbelt alarm and starter solenoid controlling seatbelt assembly such as that disclosed in U.S. Patent No. 3,133,277 dated May 12, 1964, the seatbelt sections are serially disposed within the starter solenoid circuit and the seatbelt sections must be operatively connected to each other before the starter solenoid circuit may be actuated, this of course is not always a desirable feature inasmuch as a mechanic may wish to operate the engine of the vehicle. The patentee does, however, utilize a bypass circuit for by-passing the seatbelt assemblies and provided with a normally opened switch which may be closed to momentarily complete the circuit to the starter solenoid for starting the engine. However, the circuit to the starter solenoid may obviously be closed even though the driver of the vehicle is not wearing his seatbelt. In order to complete the circuit to the starter solenoid it is merely necessary for the driver of the vehicle to buckle the four seatbelt sections together in a conventional manner. This of course would enable the driver of the vehicle to operate the same without wearing his seatbelt. In addition, inasmuch as the seatbelt on the passenger side of the vehicle is also serially disposed in the associated starter solenoid circuit, should the driver of the vehicle be operating the vehicle by himself, before he is able to operate the vehicle he must first operatively connect the free ends of the seatbelt on the passenger side of the vehicle in addition to his own seatbelt.

The main object of this invention is to provide a seatbelt alarm and circuit controlling system including means responsive to positioning of the seatbelt sections of a seatbelt assembly in other than the positions the seatbelt sections assume when in normal operation and independent of the seatbelt sections being secured to each other for rendering an alarm or actuating and/or deactivating any other circuit such as a starter solenoid circuit. However, the seatbelt system of the instant invention includes control means for actuating the associated signal alarm only if the associated seat is unoccupied and the corresponding seatbelt assembly is not properly positioned. In this manner, should the seat be unoccupied, the seatbelt sections, regardless of what positions they are in, will be ineffective to actuate the alarm. Therefore, the driver of a vehicle equipped with the alarm system of the instant invention does not have to properly position the seatbelt assembly servicing the passenger side of the vehicle but only his own seatbelt. In addition, should a mechanic wish to work on the engine of the associated vehicle, inasmuch as there would be no person sitting in either the passenger's seat or the driver's seat, the seatbelt assemblies of the instant invention would be inoperative to actuate the alarm system inasmuch as the system also includes controlling means which must first be actuated by the weight of a passenger seated on the associated seat before the positioning of the seatbelt assemblies in other than the proper operations will be effective to actuate the alarm.

Another object of this invention is to provide a seatbelt alarm system, in accordance with the immediately preceding object, specifically adapted for use with retractible seatbelt sections as well as non-retractible seatbelt sections.

Still another object of this invention is to provide a seatbelt alarm system that is adapted to be utilized in connection with retractible seatbelt sections of the type having their base ends secured to spring urged reel means as well as seatbelt sections having retracting mechanisms operatively connected thereto intermediate their opposite ends.

Still another object of this invention is to provide a seatbelt alarm system that may be readily mounted in an associated vehicle independently of any major modification of the existing seatbelt retracting mechanisms or seatbelt anchoring means.

A final object of this invention to be specifically enumerated herein is to provide a seatbelt alarm system in accordance with the preceding objects which will conform to conventional forms of manufacture, be of simple construction and easy to use so as to provide a device that will be economically feasible, long-lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary perspective view of the interior of a conventional form of motor vehicle provided with opposite side bucket seats and with a seatbelt alarm system of the instant invention operatively associated with each bucket seat;

FIGURE 2 is a fragmentary enlarged longitudinal vertical sectional view taken substantially upon a plane passing through the center of one of the bucket seats illustrated in FIGURE 1;

FIGURE 3 is a fragmentary plan view of a portion of the seatbelt alarm system illustrated in FIGURES 1 and 2 and with portions thereof being broken away and shown in horizontal section;

FIGURE 4 is a diagrammatical view of the electrical circuitry of the alarm system of the instant invention;

FIGURE 5 is a rear elevational view of one form of belt anchor means constructed in accordance with the present invention;

FIGURES 6 and 7 are side elevational views of the right side of the anchor means illustrated in FIGURE 5 and with the associated belt section fully retracted in FIGURE 6 and shown fully extended in FIGURE 7;

FIGURE 8 is a fragmentary perspective view of a vehicle seat shown with a modified form of the instant invention operatively associated therewith;

FIGURES 9 and 10 are enlarged fragmentary elevational views of the belt assembly illustrated in FIGURE 8 and with the associated belt section substantially fully retracted in FIGURE 9 and substantially fully extended in FIGURE 10;

FIGURE 11 is a fragmentary perspective view of a further vehicle seat construction showing a still different modified form of the seatbelt alarm system of the instant invention operatively associated therewith;

FIGURES 12 and 13 are side elevational views of the seat anchor utilized in the embodiment illustrated in FIGURE 11 with the associated seatbelt shown in a relaxed position in FIGURE 12 and in a tensioned position in FIGURE 13;

FIGURE 14 is an enlarged perspective view of the seatbelt anchor illustrated in FIGURES 12 and 13;

FIGURE 15 is a fragmentary perspective view of a section of seatbelt constructed in accordance with the present invention and having a seatbelt mounted retractor mounted thereon, the seatbelt being shown in a tensioned state; and FIGURE 16 is an enlarged fragmentary side elevational view of the embodiment illustrated in FIGURE 15 with the seatbelt shown in a partially coiled state about the seatbelt retractor.

Referring now more specifically to the drawings the numeral 10 generally designates a conventional form of motor vehicle which includes a flooring 12 supporting a pair of seat assemblies generally referred to by the reference numerals 14 and 16. The seat assemblies 14 and 16 represent the passenger and driver's seats in the vehicle 10 and are substantially identical in configuration and therefore the seatbelt alarm system will be specifically set forth in connection with only one of the seat assemblies.

The seat assembly 14 includes a resilient seat cushion portion 18 supported from a frame 20 and a resilient seat back portion 22. The seat assembly 14 is supported from the flooring 12 in any convenient manner such as by a frame 24 and it is to be noted that the seatbelt alarm system will operate efficiently whether utilized in connection with bucket seat assemblies such as seat assemblies 14 and 16 or a bench-type seat assembly (not shown).

The seatbelt alarm system of the instant invention is generally referred to by the reference numeral 26 and includes a pair of seatbelt section assemblies generally referred to by the reference numeral 28, one assembly 28 being disposed on each side of the associated seat but only one of the assemblies 28 having the belt switch assembly of the instant invention referred to hereinafter operatively associated therewith.

Each of the seat belt section assemblies 28 includes a spring urged winding reel assembly generally referred to by the reference numeral 30 which is supported from the floor or flooring 12 and which includes a spring actuated and journalled winding reel 32 to which one end of a seatbelt section 34 is operatively connected for winding on the reel 32.

The winding reel assembly 30 includes a housing 36 which encloses the winding reel 32 thereof and which includes a slot 38 in one end wall 40 thereof. In addition, a normally closed switch 42 is supported from the end wall 40 and includes a movable actuator 44 which may be pressed inwardly of the switch 42 to open the latter. A spring arm 46 is secured to the switch 42 at one end and has a cross-head abutment 48 carried by its other end which is slidable in the slot 38 and which projects into the housing 36 for engagement with the roll 50 of the seatbelt section 34. In addition, the cross-head abutment 48 is engageable with the actuator 46 to urge the latter inwardly in order to open the switch 42. Accordingly, when the seatbelt section 34 is fully extended as illustrated in FIGURE 7 of the drawings the spring arm 46 will swing the abutment 48 toward the switch 42 and depress the actuator 44 thereof so as to open the switch 42. However, should there be but a small amount of the belt section 34 wound on the reel 32, the abutment 48 will be urged away from the switch 42 thus enabling the spring-urged actuator 44 to assume an outer position closing the switch 42.

The alarm system 26 also includes a passenger-sensing assembly generally referred to by the reference numeral 52 and including an elongated and flexible tension member 54 stretched across the seat cushion portion 18 from its rear edge to its forward edge.

The tension member 54 includes a first section 56 anchored at one end to the forward edge of the frame 20 as at 58 and passed upwardly across the front face of the seat cushion portion 18 and then rearwardly across the upper surface of the seat cushion portion 18. The other end of the first section 56 is anchored to a spring urged actuating ring 60 of a switch assembly generally referred to by reference numeral 62. The tension member 54 includes a second section 64 which is anchored at one end to the rear edge portion of the frame 20 as at 66 and at the other end to the housing 68 of the switch 62. Ring 60 of the switch 62 includes a conductive portion 70 which is movable into engagement with a pair of contacts 72 and 74 supported within the housing 68 of the switch 62 and insulated from the housing 68 in any convenient manner. The contacts 72 and 74 are serially connected in the associated circuit actuating conductor 77 of the circuit generally referred to by the reference numeral 79 and illustrated in FIGURE 4 of the drawings.

The seatbelt assemblies associated with each of the seats 14 and 16 include the switches 42 and 62 and it may be seen from FIGURE 4 of the drawings that each pair of switches 42 and 62 is electrically disposed in the circuit 79 in parallel fashion with the circuit, grounded at 80 and 82, having a source of electrical potential 84 serially disposed therein, and including an electrically actuatable alarm signal 86 also serially disposed therein. Accordingly, if the seatbelt section 34 is not fully extended as illustrated in FIGURE 7 of the drawings the switch 42 will be closed. Further, if a person is seated on the associated seat cushion 18, the corresponding switch 62 will be closed thereby electrically connecting the source of electrical potential to the alarm device 86 causing the latter to be electrically actuated. However, should the corresponding seat be vacant the associated switch 62 will be open and thus partial retraction of the belt section 34 will not be capable of actuating the alarm 86. Accordingly, if a person is seated on the seat assembly 14 and the associated seatbelt assembly has its seatbelt section 34 fully extended as would be the case if it were operatively secured about the person seated in the seat, the alarm 86 will not be actuated. However, if the person seated on the seat assembly 14 should unbuckle his seatbelt assembly so as to allow the section 34 thereof to be even partially retracted, the corresponding switches 42 and 62 will be closed thus actuating the alarm 86.

With attention now invited to FIGURE 8 of the drawings there may be seen a modified form of tension member 54' corresponding to the tension member 54 but which is disposed beneath the outer upholstery of the seat cushion portion 18' of the seat assembly 14'. Otherwise, the tension member 54' is substantially identical to the tension member 54 and has a switch 62' operatively associated therewith corresponding to the switch 62.

In FIGURE 8 of the drawings the alarm system of the instant invention is generally designated by the reference numeral 26' and includes an anchor 76 for securing the seatbelt section assembly 28' thereof to the flooring 12' of the associated vehicle. The seatbelt section assembly 28' is similar to the seatbelt section assembly 28 with the exception that the seatbelt section 34' thereof is secured directly to the anchor 76. However, a conventional form of seatbelt section retracting means generally referred to by the reference numeral 78 is operatively associated with the seatbelt section 34' and has a switch 42' corresponding to the switch 42 operatively associated therewith. The switch 42' includes an actuator 44' corresponding to the actuator 44 and a spring arm 46' similar to the arm 46 is mounted on one of the guide portions 82 of the seatbelt retractor 78 and includes an abutment 48' similar to the abutment 48 for engaging the roll 84 disposed about the retractor 78 and engages with the actuator 44' when the seatbelt section 34' is fully extended and tensioned as illustrated in FIGURE 10 of the drawings. Accordingly, it may be seen that the operation of the alarm signal 26' illustrated in FIGURE 8 of the drawings is substantially the same as the operation of the alarm signal 26 illustrated in FIGURES 1–7.

With reference now to FIGURES 11–14 of the drawings there will be seen a still further modified form of alarm system generally referred to by the reference numeral 126 and operatively associated with a seat construction generally referred to by the reference numeral 114. The alarm signal 126 includes a passenger sensing assembly generally referred to by the reference numeral 152 corresponding to the passenger sensing assembly 52 and the base end of the seatbelt section 134 of the seatbelt section assembly generally referred to by the reference numeral 128 is secured to an anchor 125 secured to the flooring 112 of the associated vehicle in any convenient manner such as by a fastener 126. The anchor 125 has one end of a U-shaped spring arm 246 adjustably secured thereto by means of a pair of clamp assemblies 147 actuated by wing nuts 149 and the other free end of the spring arm 146 slidably engages and normally laterally deflects the belt section 134 when it is not tensioned. However, tensioning of the seatbelt section 134 such as experienced when the seatbelt section assembly 128 is in operation securing a person within the seat assembly 114, will urge the free end of the arm 146 from the position illustrated in FIGURE 12 of the drawings to the position illustrated in FIGURE 13 of the drawings depressing the actuator 144 of the switch 142 for opening the switch 142. It is to be noted that the switch 142 is utilized in the same manner in which the switches 42 and 42' are used and therefore that the wiring circuit for the signal assembly 146 illustrated in FIGURES 11–14 is substantially identical to the circuitry illustrated in FIGURE 4 excepting that the switch 142 is substituted for the switch 42 of FIGURE 4.

With attention now invited to FIGURES 15 and 16 of the drawings there will be seen a modified form of seatbelt section assembly generally referred to by the reference numeral 128' and which includes a pair of contacts 129 and 131 which may be electrically bridged by the roller 133 of the conventional belt mounted type of seatbelt retractor generally referred to by the reference numeral 135. The contacts 129 and 131 have the corresponding ends of a pair of insulated conductors 137 and 138 electrically connected thereto, the conductors 137 and 138 comprising portions of a conductor corresponding to the conductor 77 and disposed in a wiring circuit similar to the circuit 79. Accordingly, when the seatbelt section 139 along with the conductors 137 and 138 extend is partially wound about the drum 133 of the belt retractor 135, the drum 133 will bridge the contacts 129 and 131. The contacts 129 and 131, together with the roller or drum 133, therefore constitute a belt switch corresponding to the belt switches 42, 42' and 142.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a vehicle including at least one seat provided with an associated seatbelt assembly of the type including a pair of suitably anchored and releasably connectible seatbelt sections, an alarm circuit operatively connected to a source of electrical potential and having electrically actuatable signal means serially disposed therein, said circuit also including first and second switch means serially disposed therein, said first switch means normally being open and including actuating means operatively associated with said seat and responsive to the application of a downward force of a predetermined magnitude on said seat for closing said first switch means, said second switch means normally being closed, operatively associated with at least one of said belt sections, including actuator means operatively connected to said one belt section for opening said second switch means in response to extension of said one belt section to position and tension said one belt section in an operative position such as that which said one belt section assumes when secured to the other belt section to secure a passenger in said seat, said vehicle including a body from which said seat is supported, said seatbelt sections including base ends carrying anchor means secured to said body, said anchor means for said one belt section comprising a spring return drum rotatably supported from said body and about which said one belt section is wound, said actuator means including means operable to open said second switch means in response to the unwinding of a predetermined amount of said one belt section from said drum.

2. The combination of claim 1 wherein said seat includes a resilient seat cushion portion, a tension member tensioned across said seat cushion portion and anchored at its opposite ends, said tension member comprising two elongated end aligned sections, said second switch means being secured between the adjacent ends of said sections with said actuating means connected to one of said adjacent ends and operable, upon movement of said adjacent ends away from each other, to close said first switch means.

3. In combination with a vehicle including at least one seat provided with an associated seatbelt assembly of the type including a pair of suitably anchored and releasably connectible seatbelt sections, an alarm circuit operatively connected to a source of electrical potential and having electrically actuatable signal means serially disposed therein, said circuit also including first and second switch means serially disposed therein, said first switch means normally being open and including actuating means operatively associated with said seat and responsive to the application of a downward force of a predetermined magnitude on said seat for closing said first switch means, said second switch means normally being closed, operatively associated with at least one of said belt sections, including actuator means operatively connected to said one belt section for opening said second switch means in response to extension of said one belt section to position and tension said one belt section in an operative position such as that which said one belt section assumes when secured to the other belt section to secure a passenger in said seat, said vehicle including a body from which said seat is supported, said one belt section having an automatic spring actuated seatbelt retractor including a rotatable drum operatively engaged therewith intermediate its opposite ends and yieldingly urging said one belt section toward a position wound about said drum, said second switch means being supported from said retractor, said actuator means including means operable to open said second switch means in response to the unwinding of a predetermined amount of said one belt section from said drum.

4. The combination of claim 3 wherein said seat includes a resilient seat cushion portion, a tension member tensioned across said seat cushion portion and anchored at its opposite ends, said tension member comprising two elongated end aligned sections, said second switch means being secured between the adjacent ends of said sections with said actuating means connected to one of said adjacent ends and operable, upon movement of said adjacent ends away from each other, to close said first switch means.

5. In combination with a vehicle including at least one seat provided with an associated seatbelt assembly of the type including a pair of suitably anchored and releasably connectible seatbelt sections, an alarm circuit operatively connected to a source of electrical potential and having electrically actuatable signal means serially disposed therein, said circuit also including first and second switch means serially disposed therein, said first switch means normally being open and including actuating means operatively associated with said seat and responsive to the application of a downward force of a predetermined magnitude on said seat for closing said first switch means, said second switch means normally being closed, operatively associated with at least one of said belt sections, including actuator means operatively connected to said one belt section for opening said second switch means in response to extension of said one belt section to position and tension said one belt section in an operative position such as that which said one belt section assumes when secured to the other belt section to secure a passenger in said seat, said vehicle including a body from which said seat is supported, said one belt section having an automatic spring actuated seatbelt retractor including a rotatable drum operatively engaged therewith intermediate its opposite ends and yieldingly urging said one belt section toward a position wound about said drum, said second switch means being supported from said retractor, said second switch means including a pair of spaced contacts mounted on said one belt section and engageable by said drum, said contacts being serially disposed in said circuit, and said actuator means comprising said drum which is constructed of conductive material for bridging said contacts as the section of said one belt section having said contacts thereon is wound about said drum in direct contact therewith.

6. The combination of claim 5 wherein said seat includes a resilient seat cushion portion, a tension member tensioned across said seat cushion portion and anchored at its opposite ends, said tension member comprising two elongated end aligned sections, said second switch means being secured between the adjacent ends of said sections with said actuating means connected to one of said adjacent ends and operable, upon movement of said adjacent ends away from each other, to close said first switch means.

References Cited
UNITED STATES PATENTS

| | | | |
|---|---|---|---|
| 3,074,055 | 1/1963 | Rudolph et al. | 340—278 |
| 3,226,674 | 12/1965 | Eriksson | 340—278 |

JOHN W. CALDWELL, *Primary Examiner.*

NEIL C. READ, *Examiner.*

A. H. WARING, *Assistant Examiner.*